Jan. 28, 1958  F. O. HESS  2,821,127
BROILER
Filed July 1, 1955
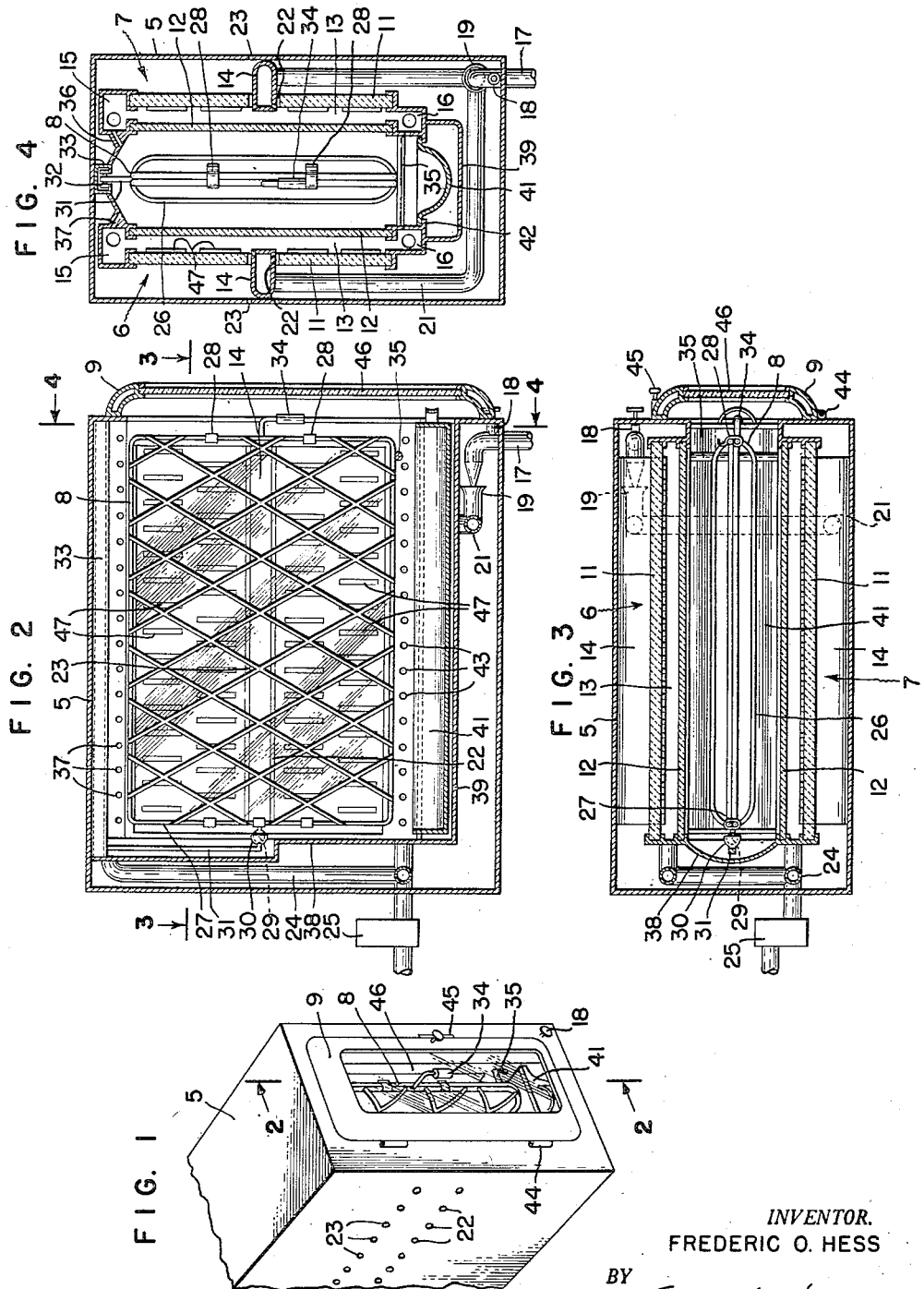
INVENTOR.
FREDERIC O. HESS
BY
*E. Willford Mason*
ATTORNEY.

United States Patent Office 2,821,127
Patented Jan. 28, 1958

2,821,127

BROILER

Frederic O. Hess, Philadelphia, Pa., assignor to Selas Corporation of America, Philadelphia, Pa., a corporation of Pennsylvania Application July 1, 1955, Serial No. 519,387

4 Claims. (Cl. 99—389)

The present invention relates to broilers, and more particularly to a broiler in which meat, such as steaks and chops, can be cooked rapidly by radiant heat.

It is customary at the present time to place a piece of meat to be cooked on a grid of some type, and to move it under a cooking element such as a gas burner or an electrical heating unit, or to move the grid over a fire of some type. In either case, the meat is cooked on one side and must be turned in order to be cooked on the other side. When the meat is placed over a fire, the juices therefrom drop into the fire and are lost.

It is an object of the present invention to overcome the above objections by providing apparatus for broiling meat in which the meat is cooked simultaneously on both sides. It is a further object to hold food to be coked in a vertical position between a pair of radiant heat sources while the coking process is being carried out.

Another object of the invention is to provide a novel rack for holding food while it is being cooked, and means for supporting the rack in a cooking device.

In the present invention, there is provided a vertically disposed cooking unit having a pair of oppositely disposed radiant heating units. Located between the heating units is a rack in which the food is supported during the cooking process. This rack is supported for movement into and out of cooking position, as well as being mounted so that it can be rotated into a position in which food can easily be placed upon it.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a perspective view of the broiler;

Figure 2 is a section taken through the broiler on line 2—2 of Figure 1;

Figure 3 is a section taken on line 3—3 of Figure 2, and

Figure 4 is a section taken on line 4—4 of Figure 2.

Referring to the drawings, there is shown a broiler having an outer casing 5 in which are located a pair of opposed heating units 6 and 7. Between these heating units, there is a rack 8 for holding the food to be broiled. Access to the interior of the broiler is obtained through a door 9.

The heating units 6 and 7 are similar and comprise a pair of vertically spaced refractory plates 11 that are held in spaced relation to a glass plate 12 that is capable of withstanding high temperatures and passing radiant heat rays. The space between the plates 11 and 12 forms a combustion chamber 13 into which fuel is introduced by a longitudinally extending manifold 14. It will be noted from an inspection of Figure 4 that the manifold is midway between the top and bottom plates 11. The products of combustion produced in the combustion chamber 13 are withdrawn from a top manifold 15 and a bottom manifold 16.

Fuel is supplied to the broiler through a pipe 17 having a valve 18 therein. This pipe discharges gas in a conventional manner into a venturi 19 which aspirates additional air, so that a rich mixture of gas and air flows through pipes 21 to the manifolds 14. This mixture is discharged in a plurality of jets, some from the upper surface of manifold 14, and some from the lower surface, so that the mixture is burned as it is flowing vertically across the ceramic plates 11. Slots 22 are provided between the manifold 14 and the adjacent plate 11, so that additional air for combustion can flow into the chamber 13 to complete combustion of the fuel. Holes 23 are provided through the casing to supply this additional air to the slots 22. The products of combustion, as noted above, are withdrawn through manifolds 15 and 16 in the upper and lower ends of the combustion chamber respectively. These manifolds, which are four in number, are connected by an exhaust pipe 24 which is in turn connected to the intake of an exhaust fan 25.

Rack 8 for holding the food consists of a pair of wire frames 26 that are pivoted to each other in the rear of the broiler, as best shown in Figure 3, by a hinge 27, while the front end of the frames are fastened together to hold the food in position by means of a pair of clasps 28. The rack is supported at its rear end by means of a ball and socket joint which consists of a ball 29 attached to the rack at the hinge 27 and a socket 30 on the lower end of a rod 31. The upper end of this rod is provided with a carriage 32 having wheels on it that roll in a track 33 fastened lengthwise of the broiler. The front end of this rack is provided with a handle 34, so that it can be moved into and out of the cooking chamber between the heating units 6 and 7. It is noted that a rod 35 extends between the two heating units adjacent to the lower front portion of the cooking chamber upon which the outer end of the rack can rest when it is in the retracted or cooking position shown in Figure 2.

The upper part of the cooking chamber between the ducts 15 is formed of a sheet of metal 36 that has a plurality of small openings 37 leading to the ducts 15 on each side of track 33. The remainder of the chamber is formed by a back plate 38 and a bottom plate 39. The inner sides of the metal forming the ducts 16 is provided with a pair of shelves 42 on which is placed a tray 41 for catching the juices coming from the meat during the cooking operation. This tray can be moved out of the cooking chamber by sliding along the shelves 42. It is noted that the ducts 16 and the cooking chamber are in communication by means of a plurality of small openings 43 in sides of the ducts 16 immediately above tray 41.

The door 9 on the front of the broiler is hinged at one side as shown at 44, and the other side is provided with a handle 45. Any suitable type of gasket can extend between the door and the frame of the broiler. It is noted that the door may be provided with a glass window 46, so that the cooking operation can be observed. If it is desired or necessary, the space between housing 5 and those portions of the apparatus forming the heating units and cooking chamber can be filled with insulating material.

In the operation of the apparatus, the gas supply is turned on by the handle of valve 18 which also simultaneously operates some conventional type of ignition to ignite the gas flowing into the combustion chambers 13. Also simultaneously, the motor of fan 25 is started in operation. As the gas burns in the combustion chamber during its travel between the manifold 14 and the ducts 15 and 16, respectively, the ceramic plates will be heated to incandescence. These plates will reflect radiant heat through the glass plates 12 to cook the food that is supported in rack 8. The surface of the refractory plates may be provided with projections 47, if it is so desired, in order to increase turbulence in the flow of gas across the plates, and also to increase the area of the plates and thereby their temperature. As the heating units increase in temperature, the food in the rack will be broiled.

When placing food in the rack, handle 34 will be clasped to move the rack out of the cooking chamber or to the right in Figure 2. When the rack is completely extended, carriage 32 on rod 31 will be at the right end of track 33 in that figure. The rack can then be rotated around the ball and socket joint and the clasps 28 released in order to place the food on the rack. Thereafter, the clasps are fastened, the rack rotated and moved to the left in Figure 2 to cooking position. During the time the broiler is in operation, the products of combustion as well as the cooking fumes are removed by fan 25.

While the broiler is described herein as having a pair of heating units, one on each side of the rack, it will be obvious that it can be constructed with a single heating unit and the rack rotated to cook first one side of the food and then the other. It is intended that a broiler of the type shown herein should be built into a suitable wall space provided in a kitchen to form, preferably, a flush mounted unit along with the other kitchen appliances. In this case, the exhaust fan 25 could be connected to exhaust directly to the atmosphere. It will be apparent, however, that a cooking unit of this type could be used as any other stationary gas appliance whether or not it is built into the kitchen wall.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. In a broiler, a pair of oppositely disposed, vertically extending heating elements, each of said elements including a refractory plate forming the back and a sheet of material transparent to heat rays forming the front thereof, means to support said plate and sheet in spaced relation to form a combustion chamber, said means including a duct extending lengthwise of said chamber at the top thereof, a manifold extending parallel to said duct below the same, said manifold being provided with ports through which fuel can be discharged along the surface of said plate, the space between the sheets of said heating elements forming a cooking chamber, means forming passages between said cooking chamber and the ducts of said cooking elements, an exhaust blower connected to both of said ducts, a rack to support food to be cooked in said cooking chamber, and means to mount said rack for movement from a position between to a position beyond said cooking elements.

2. In a broiler, the combination of a casing, a pair of oppositely disposed, vertically extending heating elements in said casing, each of said elements including a refractory plate, a duct extending horizontally along the upper edge of said plate, a horizontally extending manifold through which fuel and air is supplied, said manifold being provided with ports through which the fuel is discharged to be burned along the surface of said refractory plate, a sheet of material transparent to heat rays in front of said refractory plate and spaced therefrom to form a combustion chamber, the space between the sheet of each cooking element forming a cooking space, means forming passages between said cooking space and each duct, exhaust blower means connected to each duct, a rack for supporting food in said cooking space, and means to mount said rack for movement from a position between to a position beyond said cooking elements.

3. The combination of claim 2 in which each cooking element includes a second duct extending horizontally beneath the refractory plate, said manifold being located midway between said ducts, and the ports thereof being directed toward each duct, and means to connect said second ducts to said exhaust blower.

4. In a broiler, structure forming a vertically extending cooking space with a heating element on each side thereof, a track extending parallel to said elements at the top of said space, a rack including a pair of oppositely disposed wire frames pivoted to each other at one end, a swivel joint at said pivoted end, supporting means extending between said joint and said track and riding on the latter, a clasp at the opposite end of said frames to hold them together, and means extending horizontally between the lower portion of said heating elements adjacent said opposite end to support said end of the rack.

References Cited in the file of this patent

UNITED STATES PATENTS

| | | |
|---|---|---|
| 457,316 | Gibbons | Aug. 4, 1891 |
| 521,718 | Koll | June 19, 1894 |
| 1,069,390 | Connolly | Aug. 5, 1913 |
| 1,677,564 | Murray | July 17, 1928 |
| 1,746,698 | Galer | Feb. 11, 1930 |
| 2,285,127 | Rerucha | June 2, 1942 |
| 2,511,790 | Scofield | June 13, 1950 |
| 2,564,677 | Dabis | Aug. 21, 1951 |